Aug. 28, 1956   R. L. ROUGEMONT ET AL   2,760,232
AUTOMATIC WEIGHING MACHINE

Filed Jan. 11, 1954   2 Sheets-Sheet 1

INVENTOR.
R. Louis Rougemont
and Francis P. Dunigan
BY Clayton L. Jenks
ATTORNEY INVENTOR.
R. Louis Rougemont
and Francis P. Dunigan
ATTORNEY United States Patent Office 2,760,232
Patented Aug. 28, 1956

2,760,232

AUTOMATIC WEIGHING MACHINE

René Louis Rougemont, Worcester, and Francis P. Dunigan, Holden, Mass.; said Dunigan assignor to said Rougemont Application January 11, 1954, Serial No. 403,118

5 Claims. (Cl. 18—30)

This invention relates to an automatic weighing machine, and more particularly to a weighing, feeding and molding machine having mechanism which compensates for an over-feeding of material weighed and fed automatically to the mold.

A standard mechanism for injection or compression molding of thermosetting or thermoplastic polymeric resins comprises a hydraulically operated plunger which moves powdered molding material through a heating zone and forces it into the mold under high pressure. In one construction, the molding material is a powder that is fed by means of a vibrating mechanism to a weighing bucket on a balance arm which automatically delivers its charge to the plunger feeding passage when a predetermined amount of material has accumulated in the bucket. The vibrator mechanism is stopped automatically when the bucket has received the required load and a gate at the bottom of the bucket is opened to discharge the weighed material. It is found, however, that the material delivered from the vibrator trough often discharges unevenly into the bucket due to various causes, such as where vibrations of the machine and impossibility of making an absolutely accurate weighing mechanism cause an excess of material to be fed to the bucket. The plunger delivers a pressure of several tons per square inch, and if too much material is fed into the plunger delivery passage, the plunger may be stalled by the mold becoming completely filled before the plunger piston has reached its seat in the hydraulic chamber. Hence the full pressure of the plunger remains on the material in the mold and may distort the mold to the extent of making the article larger than the required dimensions, or it may spread the mold parts and provide what is known as a flash or fin edging of molded material projecting from the crevice between the mold halves. A more serious problem is found in the sticking to the mold of the molded part, as is caused by the excess of material or pressure, so that the operation of the machine is thus hindered. Such excessive pressure also forces the mold material into the corners of the mold and may develop too sharp an edge on the article, which is undesirable for certain types of molded product where a less compacted and more rounded edge portion is desired. If the bucket overweighs by even a few grams per plunger movement, this serves to accumulate material in the heater and plunger passage with each cycle of the machine, and after a few cycles these parts must be cleared before the machine may be operated satisfactorily. It is desirable to feed the correct amount or even to starve feed the material so that the plunger will go to the limit or maximum distance of travel each time.

The primary object of my invention is to overcome such disadvantages and to provide a weighing machine which automatically weighs and delivers a weighed charge of material and wherein an overfeeding of material is automatically compensated within close limits.

A further object is to provide a weight compensating mechanism which automatically compensates for an over-weighing of material in a balanced bucket by applying a slight force to augment the bucket weight and provide a predetermined shortage in the amount of the bucket contents and thus restore a desired starve feeding condition.

Another object is to provide a precisely adjustable weight compensating mechanism which may be controlled either manually or automatically to insure feeding a desired amount of material by an automatic weighing apparatus.

A further object is to provide an automatic weighing mechanism in association with a molding machine having a mold filled by a reciprocable plunger which may normally provide a starve feeding operation whereby an accidental or undesired feeding of excess material to the plunger and mold causes a weight compensation or a weight shortage for the next molding step so that the normal or desired feeding may be resumed.

A further object is to provide a weight compensating mechanism in such a plunger operated molding machine which insures adequate compensation for an over-feeding of material and a satisfactory molding of articles in a continuous sequence. Other objects will be apparent in the following disclosure.

Referring to the drawings.

Figure 1:
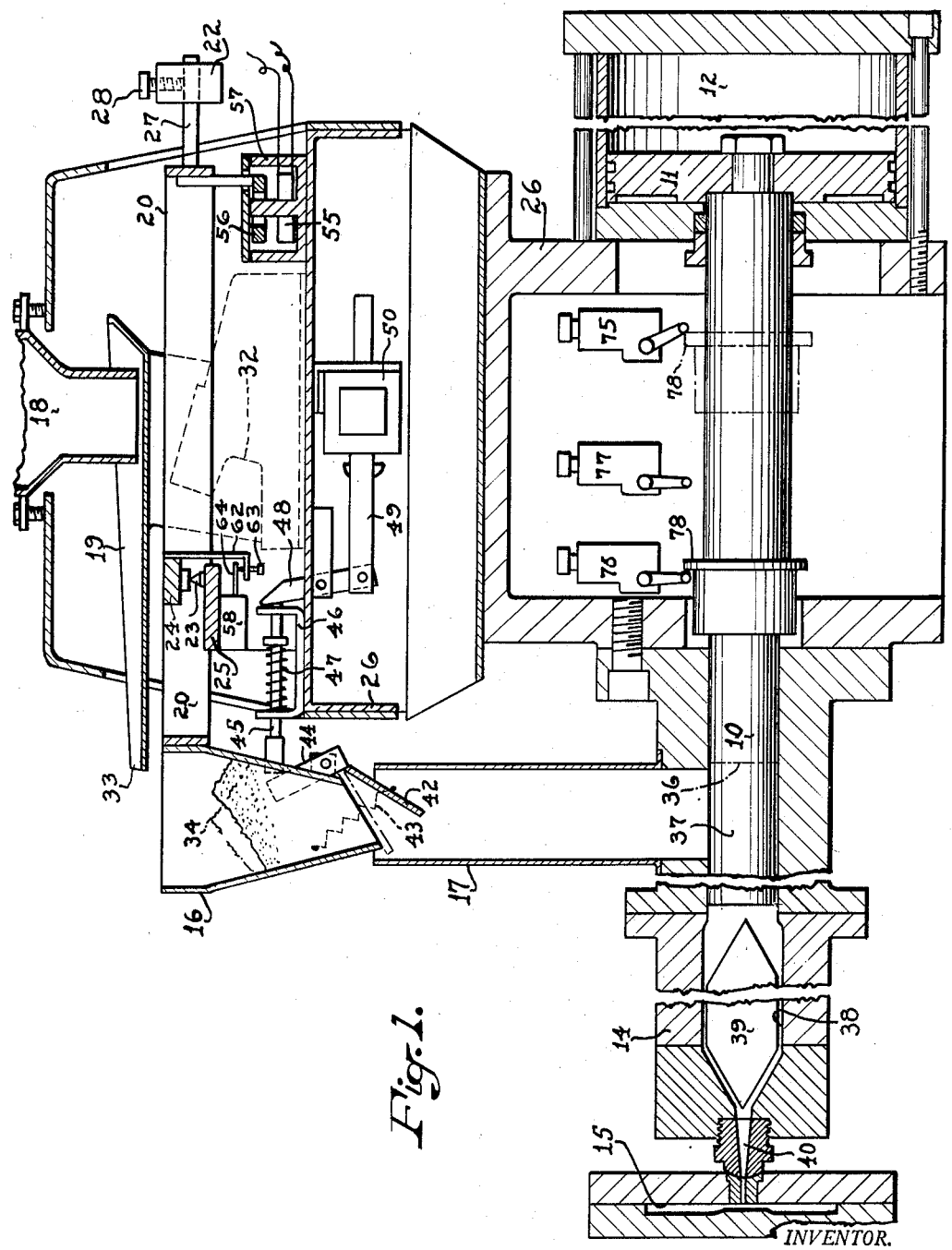
Fig. 1 is a fragmentary sectional view of portions of a molding apparatus to which my compensating device has been applied with the parts in the position of dumping the bucket contents and the plunger piston retracted.

One form of standard molding machine comprises a plunger 10 reciprocated by means of a piston 11 mounted in a suitably governed hydraulic piston chamber 12 and adapted to force the molding material through a heater 14 into a mold 15 where the material is shaped as a desired article. The molding material is fed from a weighing bucket 16 through a tube 17 to a position where it is forced by the plunger 10 through the heating zone and into the mold. The powdered or granular material is derived from a suitable hopper 18 and may be fed to the bucket by means of a vibrating trough 19 which is arranged to receive the material from the hopper and deliver it as required, the feed being stopped by the act of stopping the vibration of the trough. The material is weighed in a precise amount by means of a suitable weighing device and preferably a balance arm 20 carrying the bucket 16 on one end and an adjustable weight 22 on the other end. This balance arm 20 is a lever of the first class mounted on a suitable fulcrum 23 thereneath, which may comprise two knife-edged wedges arranged side by side to support a flat plate carried on the under side of a cross arm 24 suitably mounted on the balance arm 20. The fulcrum 23 is supported on a rigid cross arm 25 carried beneath the balancing lever 20 and mounted on the framework 26 of the machine. In this construction, the balance arm may comprise a rectangular frame having the fulcrum supporting arm 24 suitably welded between the parallel sides of the frame and arranged to carry the fulcrum plate which rests on the fulcrum 23. The balancing weight 22 is shown as slidably mounted on a projecting arm 27 secured to the frame and forming a prolongation of the balance arm 20. The weight may be finely adjusted in position and fixed by means of a screw threaded clamp bolt 28 which locks the weight to the arm extension 27. The bucket 16 is hopper shaped and suitably secured, as by welding, to the opposite end of the balance frame 20 in a vertical position with its lower tapering end arranged to empty the bucket contents into the wide mouthed tube 17 therebeneath.

A suitable feed mechanism which may be employed for introducing a required amount of granular material into the bucket may comprise a substantially horizontal vibrating metal trough 19 secured above the balance arm 20. This trough is positioned beneath an extension throat 30 of the hopper 18, and the parts are so spaced that only a shallow layer of material may be fed into the trough 19 from the hopper. This trough 19 is arranged to be vibrated by a suitable mechanism, which is known in the industry as a feed syntron. This part, indicated generally by the numeral 32, is a magnetically or electrically operated vibrator attached to the trough and arranged to provide a high speed vibration when energized electrically and so cause the material to feed toward the open end 33 of the trough and thus fall into the bucket. When the electric power to the vibrating device 32 is cut off, the forward feed of the material stops substantially instantly. It will, however, be appreciated that vibration of the machine may cause the material to pile in the bucket with a slight variation of its center of mass depending to some extent upon where the point 34 of the cone of the granular material may happen to be located in the bucket. Even more important, such vibration may cause the feed trough to deliver material after its feeding motion has been stopped, and this excess causes the molded article to stick in the mold or other undesired effects. The primary object of my invention is to insure a starve feeding of a desired amount of material to the mold and to compensate periodically for a predetermined variation thereof from a desired normal and thus restore the starve feeding.

When the piston 11 in the hydraulic piston chamber 12 is moved to its right hand position and the left hand end of the plunger 10 is located in the dotted line position 36 (Fig. 1) the material is fed from the bucket into the passage 37 in advance of the plunger 10 and then forced into the annular passage 38 around a core 39 in the heater 14 where the material is suitably softened to a moldable condition. Thereafter, it is forced through a suitably shaped nozzle 40 into the molding chamber 15. This mold may be formed, as is understood, of two mold halves suitably shaped and held together to withstand the extremely high molding pressure of the plunger. If too little material is fed into the mold, then of course the mold is not adequately filled and the shaped article is defective. If, on the other hand, too much material is fed forward, then when the mold has become filled, the plunger 10 has not yet attained its maximum forward position and the hydraulic pressure continues in its attempt to force more material into the mold, with various types of results, such as distorting the mold or creating flash fins, or a sticky mold.

The bucket 16 may be emptied automatically by an electrically controlled construction comprising a gate 42 pivotally mounted on ears projecting from the side of the hopper. A tension spring 43 suitably connected between the gate and bucket tends to hold the bucket contents from being discharged except when the gate is forcibly opened. A lever arm 44 fixed to and movable with the gate 42 is adapted to be struck and to move the bucket gate from the closed position of Fig. 2 to the open position of Fig. 1. This is done by means of a slidable rod 45 mounted on a U-shaped standard 46 and pressed by the coiled compression spring 47 toward a rearward inoperative position, as shown. The slide rod 45 is moved toward the left by a lever 48 of the first class which is suitably pivoted on the machine framework 26. The lever is pivotally connected to the core 49 of a solenoid 50. The solenoid and its core are so constructed that when the solenoid is energized by the alternating current, or a direct current if provided, the core 49 is pulled toward the right and thus thrusts the slide rod 45 toward the left to strike the gate lever 44 and cause the dump gate 42 to be opened. This solenoid is actuated in a timed relationship with other parts of the mechanism and controlled both by a normally open manually operated switch 51 (Fig. 3) as well as automatically, as will be described.

The material should be fed forward in what is known as starve feeding or in a slightly insufficient amount, so that the hydraulic ram plunger 10 may go forward to its maximum distance at each stroke. This procedure has defects, since the standard types of spring or weight balanced weighing device is not always accurate, or machine vibration may interfere with the control of the material fed to the mold, so that the amount may be at times too great in quantity for proper molding. In accordance with this invention we propose to compensate for a predetermined variation from a normal of the amount of material being weighed in the bucket. It is preferred to provide a starve feeding of material to the bucket and yet to insure that the mold is filled each time, but if any excess of material accumulates, there should be a weight compensation which restores the starve feeding. In this machine, the compensating device is brought into operation by failure of the plunger 10 to travel to its maximum distance of molding action. This insures that a slightly decreased amount of material is fed to the bucket at the next step, so that the plunger will then go home.

Of the various types of compensating devices which may be employed, we prefer to use a magnetic attraction field or repulsion field which provides a slight force that may be applied to a movable body connected to the movable bucket carrying balancing member, such as the balance beam 20, to supplement the weight of the bucket contents and so cause a slight variation in the weighing action. A suitable compensating device furnishing an electric repulsion field comprises a helical coil winding 55 mounted to repel a copper ring 56 when energized by a suitable alternating current. In this construction, a plurality of stationary thin E-shaped iron laminations 57 are stacked with I-shaped laminations to provide an open ended core body within which the copper disk 56 is mounted in axial alignment with the field producing coil 55. The coil and the disk are mounted to surround the middle arm or core of the E-shaped transformer laminations. The copper ring is carried by the balance arm 20 as illustrated, and it is freely movable and so positioned that when the coil is energized by an alternating current, the ring of copper or other non-magnetic metal will be repelled by the field according to the operating principles of an electric repulsion motor. This serves to apply a slight torque to the balance lever 20 and cause the bucket 16 to descend when the load becomes a few predetermined grams less than that normally measured by the counterbalancing effort of the weight 22. It will also be understood that we may use a direct current solenoid having a movable core connected to the balance arm 20 which is arranged to supplement the weight of the bucket and cause the arm to move. Such constructions are to be considered as equivalents in this invention.

The material fed by the vibrating trough 19 is controlled by a power circuit comprising a suitable normally closed micro-switch 58 carried on the cross beam 25 (Fig. 1) which is connected across the 110 volt 60 cycle alternating current power line (Fig. 3) in series with a full or half wave rectifier 59 which supplies a direct current to the solenoid operated feed device 32 connected to vibrate the feed trough 19, and a variable potentiometer 60 which governs the feeding operation. The parts are so arranged that when the bucket descends with its measured load, the power circuit to the feeding unit is broken and the vibration of the trough 19 is stopped so that no further material goes into the bucket. The switch operating mechanism, shown in Fig. 1, may comprise an L-shaped arm 62 carried on the central portion of the right hand side of the cross beam 24 of the balance beam 20. An adjustable set screw 63 on this arm 62 projects upwardly and is arranged to be brought into contact with a lever 64 suitably connected to the normally closed micro-switch 58 and arranged to break the power coil circuit 55 when the bucket tips downwardly. A manually operated normally closed switch 65 may be included in the circuit.

Figure 2:
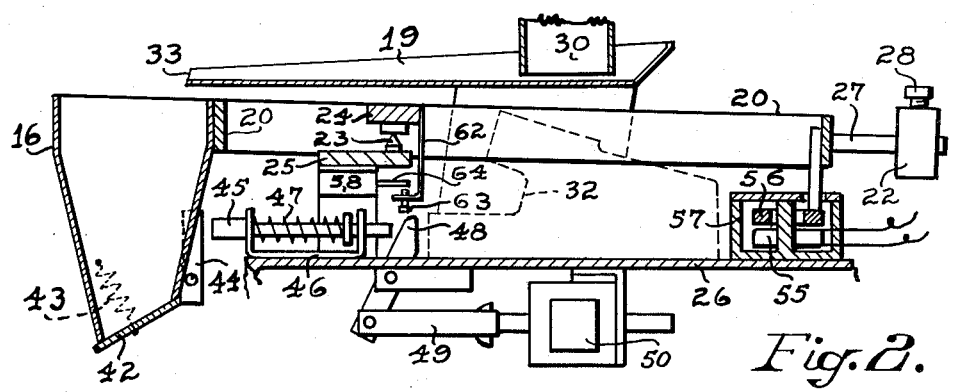
Fig. 2 is a detail showing the bucket balance arm and compensating device in the position of loading the bucket.

The circuit for the compensating device coil 55 may comprise a potentiometer 70 adapted to adjust the strength of the alternating field and thus vary the repulsion action on the copper disk 56 which is connected to the rocking beam 20 of the weighing mechanism. A normally open manually operated switch 72 may be placed in the circuit, so that the compensating mechanism may be operated under manual control when the operator of the machine observes conditions that warrant the same. The automatic operation of the compensating device involves the use of three special switches 75, 76 and 77 which have actuating rocking arms so arranged as to be operated by a suitable lug or operating member 78 moved in timed relation with or carried by the plunger 10, as shown in Fig. 1.

The end switches 75 and 76 (Fig. 3) are each double switches having two stationary contacts and a swinging arm therebetween so arranged that one switch identified by the letter A is normally open and the other identified by the letter B is normally closed. The double switches 75A and 75B are controlled and operated by a relay coil 80, and the double switches 76A and 76B are controlled and operated by another relay coil 81 connected into the circuit as illustrated. The dotted lines in Fig. 3 which connect the relays and the switches indicate this mechanical arrangement. There is a normally open holding switch 83 in the circuit of 75B and parallel with the switch 76A. This switch 83 and a normally closed holding switch 85 are controlled by coil 80. A normally open holding switch 86 is controlled by the coil 81. Switches 85 and 86 are arranged in the parallel circuits of the single normally open switch 77 and the normally closed switch 76B. The main power line is controlled by a switch 87. The solenoid 50 which controls the bucket dumping is in series with the parallel circuit switches 75A and 51 and is operated automatically when the plunger contact 78 closes the normally open switch 75A at the right hand end of its travel.

The compensating coil 55 is arranged in series with the variable resistance or potentiometer 70, which serves to adjust the repulsion action on the weighing beam and thus varies minutely the force applied thereto, and the coil is in series with three parallel circuits including the normally open switch 77 and the normally closed holding switch 85 in one line, and in a second line are the normally closed switch 76B and the normally open holding switch 86. The third circuit includes the normally open hand operated switch 72 and a holding coil 90, the core of which cooperates with a normally closed holding switch 92 in the relay coil 81 line in such a manner that when it is intended to operate the compensating device manually the coil 90 will open the switch 92 and thus permit the compensating circuit to be made only through the manually closed switch 72 and the compensating device, since switches 77 and 86 are normally open.

Figure 3:
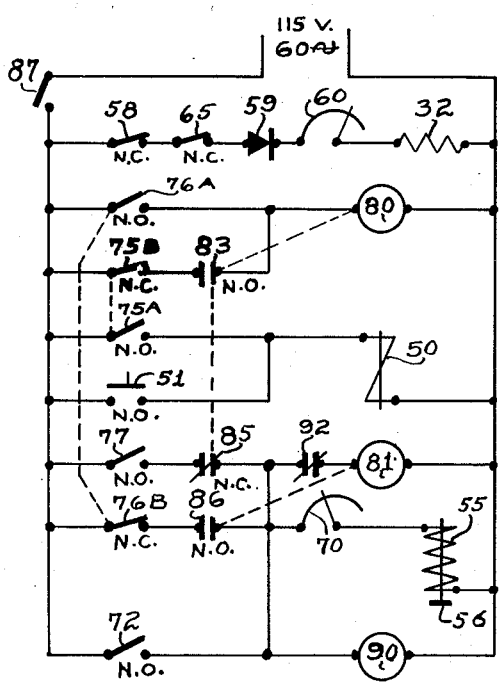
Fig. 3 is a wiring diagram of the electrical circuits pertaining particularly to the material feed, the bucket dumping, and the compensating device control.

This arrangement of electrical apparatus will be better understood by reference to the operation of the mechanism. When the plunger 10 is moved toward the right to the end of its travel, the contact arm on the double switch 75 is moved by the plunger contact member 78 to a position where the normally open switch 75A in the bucket dumping circuit is closed and the normally closed switch 75B is opened. This causes the bucket 16 to be dumped at the time when the plunger is at the right hand end of its travel. If desired, the hand operated switch 51 may be employed at any time to empty the bucket into the plunger passage 37. When the plunger 10 starts back toward the left, it releases the double switch 75 so that its two switch parts A and B return to their normally open and normally closed positions respectively, as shown in Fig. 3. By this time, the beam 20 has returned to the empty bucket position and the switch operating contacts 63 and 64 have moved out of contact, so that the normally closed switch 58 is closed and thus starts the vibration of the trough 19 through the vibrator mechanism 32, and the feed of the granular material begins again. The bucket door 42 will have been closed by the tension spring 43 when the magnet coil 50 is deenergized. Thus the feed of the material continues until the weight of the bucket is such as to overbalance the adjustable weight 22 and cause the bucket to descend and again open the switch 58 to stop the vibrator feed.

The plunger 10 is timed to move toward the left when the charge has been dumped and it ultimately actuates the middle normally open switch 77. This does two things. First, it makes a circuit through the compensating device 55 because switches 85 and 92 are normally closed, thus causing the weight compensator to apply its repulsion force to the beam 20. The force is initially insufficient to affect the operation of the beam or until the few grams of repulsion force thus applied are enough to cause the weight of the bucket to balance the weight 22. When the switch 77 is closed momentarily by the plunger moving toward the left, its second effect is to cause the movable core of the relay coil 81 to close the normally open holding interlock switch 86. This establishes a holding circuit which maintains the compensating coil 55 energized after the switch 77 has been passed by contact 78 and released to a normally open condition. The contact of the plunger lug 78 with the swinging arm of switch 77 thus provides a momentary closing of the circuit through the compensating coil 55 while the bucket is being again loaded by the action of the syntron vibrating mechanism 32, and this circuit remains energized under certain circumstances and pushes against the balancing arm 20 until it moves to empty the bucket.

If the bucket charge is light or provides what we may call a "starve feeding" operation and there is only enough material to fill the mold, then the plunger 10 will go to the extreme left hand end of its travel. Thereupon the contact member 78 on the plunger 10 will operate the last switch 76 to open switch 76B and to close the normally open switch part 76A. This kills coil 81 and simultaneously energizes the relay coil 80 and causes its solenoid core to move the interlocking switches 83 and 85. This establishes a circuit through the normally open holding switch 83 and the normally closed switch 75B and holds the coil 80 energized after the switch 76A later returns to a normally open position when released by the plunger contact 78. At the same time that switch 76 is actuated by 78, the normally closed interlock switch 85 is opened by the action of the core of coil 80, and this prevents energizing the compensating device on the return movement of the plunger, since switches 76B and 77 are then open. That is, if switch 76 is actuated, it serves to break the circuit to the compensating coil 55 and hold it open for the rest of the bucket weighing cycle and plunger movement. It will be appreciated that there is only a very short time interval between the operations of switches 77 and 76 by the plunger. Thus, for a normal feeding of the correct or an insufficient amount of powdered material, the circuit to the compensating device 55 will be broken by actuation of switch 76, and the device will not apply a repulsion effort on the balance beam 20 for long enough time to have a material effect.

The return trip of the plunger toward the right causes the normally open switch 77 to be again struck and closed, but since the two interlocked switches 83 and 85 are actuated together by the energized coil 80, switch 83 remains closed and the normally closed switch 85 is open, so that a momentary closing of the switch 77 does not establish a circuit and nothing happens at this phase of the right hand directional movement of the plunger. The function of the open switch 85 is to prevent the compensating device from being energized by the right hand return movement of the plunger if the end switch 76 has been previously operated. The double switch 76 thus has two functions, one being to govern the holding coil 80 and cause the interlock holding switch 83 to maintain the coil 80 circuit and to hold switch 85 open. As to the other function, when the normally closed switch part 76B is opened by the plunger movement, it opens the second circuit to the compensating device and so sets up a condition for the next plunger movement which prevents the compensating device from being energized. This condition prevails only when the normally closed switch 76B is opened because of the feeding charge being light.

When the contact member 78 returns to the right from its contact with the switch arm 76, the switch parts 76 will return to their normal positions and 76B will become normally closed and 76A normally open. However, the relay coil 80 remains energized because of the holding interlocks 83 and 85. Although the switch 76B is closed, the compensating circuit is nevertheless dead and the weighing beam is not affected because of the normally open switches 86 and 77. A momentary operation and closing of switch 77 by the plunger movement to the right does not restore the compensating circuit because switch 85 remains held open. Hence switch 76, when operated, serves to break the previously closed circuit to the compensating coil. Otherwise, the coil 55 applies its repulsion force to the balance beam at the next bucket loading cycle.

The hopper in the meantime is being filled during the plunger movement, and when the balance beam 20 moves, the vibrator is stopped because of the switch 58 being opened by the movement of the beam. The plunger 10 has now reached the right hand end of its travel, and in so doing again actuates the switch 75 to open the switch part 75B and kill the coil 80, and to close the switch part 75A which causes the dump solenoid 50 to operate. That is, the normally closed switch 75B, upon being opened, deenergizes the coil 80, and the switches 75A and 75B return to their normal positions, thus getting ready for the next plunger operation.

If, on the other hand, the plunger chamber 37 has become overfilled with material and the plunger 10 cannot go home to its extreme left hand end position of travel, another set of conditions is set up. That is, the contact member 78 does not strike and actuate the swinging contact arm of switch 76. Thus the switch 76B remains normally closed and 76A normally open and the holding interlock coil 80 is dead and switches 83 and 85 are in their normally open and closed positions respectively. However, the switch 77 has previously made the compensating coil circuit by energizing coil 81 and closing the holding interlock switch 86, and the repulsion effort remains applied to the beam 20 during the plunger movement cycle and while the bucket is being loaded. This causes the next bucket charge to be slightly under weight, so that a starve feeding condition will be again had and the plunger will again move towards the left to its maximum distance. Thus, if machine vibration or improper setting or action of the weighing mechanism serves to weigh out a slight excess of material, then when enough excess has accumulated and the plunger fails to actuate switch 76, the compensating device will introduce its weight correction. The purpose of the end switch 76 is thus to deenergize the compensating coil 55 if the plunger 10 moves far enough to the left to actuate the switch. Otherwise, the compensation circuit established by switch 77 remains energized.

The machine serves automatically to compensate for a predetermined variation from a normal starve feeding weight or an accumulation of slight overweights in successive stages, and preferably by applying a small force which augments or varies the gravitational pull on the material fed into the bucket and so causes a weight shortage or a variation from a desired normal. In its association with a molding machine having a reciprocable plunger to fill a mold, the weighing mechanism is preferably set for a starve feeding, but circumstances, such as vibration, may cause a feeding of a slight excess of material to the plunger chamber at various molding strokes. When a predetermined excess of material has accumulated in a succession of molding stages, the automatic weight compensation serves to bring the feeding back to an initial desired amount so that the molding successively of articles may be continuous and repetitive without forming defective articles. The compensation force is applied to balance the bucket, whatever may be the type of the weighing mechanism employed, and that effect is produced whenever there is a predetermined accumulation in the plunger chamber.

Under some molding conditions, the machine operator may find that the molded part sticks seriously to the mold, even when too little excess of material has accumulated to cause the plunger to escape the switch 76. In that case, the operator closes the manually operated switch 72 and causes the compensating device to restore the starve feeding conditions. For a simplified form of machine, the automatically operated compensator circuits may be omitted and full reliance had on a manually operated switch, such as part 72 without the holding coils and other automatic switches. In that case, an absence of adhesion to the mold indicates starve feeding, and the compensator will be used only as an emergency dictates.

Hence, it will be appreciated that various mechanical and electrical equivalents may be substituted for many parts of this machine. Therefore, the above description of a preferred embodiment is not to be interpreted as imposing limitations on the appended claims.

Having thus described the invention, what is claimed as new is:

1. An automatic molding machine comprising a mold, a plunger movable to force material into the mold, a movable balancing member carrying a bucket and providing for weighing the bucket contents, feed mechanism to deliver material to the bucket for weighing, means for discharging the bucket contents for movement to the mold by the plunger, means rendered operative by movement of the balancing member by its bucket load to stop the feed mechanism, means for discharging the loaded bucket contents, an electrical compensating mechanism providing an electrical field and a body moved by the field which applies a force to supplement the weight of the bucket contents and thereby decrease the amount fed by the feed mechanism, manually controlled electrical circuits to render the compensating mechanism effective and a supplemental electrical circuit and a switch controlled by the plunger movement which causes an automatic energizing of the compensation field to decrease the weight of the next charge when the plunger fails to move through a maximum travel in forcing material into the mold.

2. An automatic molding machine comprising a mold, a plunger movable normally to an end position to force material into the mold, a movable balancing member carrying a bucket and providing for weighing the bucket contents, feed mechanism to deliver material to the bucket, electrically controlled mechanism comprising a switch rendered effective by a bucket loaded movement of the balancing member to stop the feed mechanism, discharge mechanism to deliver the bucket contents to the plunger, an electrical compensating mechanism providing an electrical field to apply a force to and move the balancing member and thereby decrease the amount of material fed to the plunger, and an electric circuit including a switch moved by the plunger which is effective upon failure of the plunger to move substantially to the end position to cause the compensating mechanism to apply force to the balancing member and decrease the weight of the bucket contents for a subsequent weighing operation.

3. A machine according to claim 2 in which the electric circuit comprises a set of switches and a contact movable with the plunger for operating the switches in sequence, one of the switches being an end switch located to be operated only when the plunger reaches said end position, said circuit serving when the switches are operated normally to render the compensating mechanism ineffective and being arranged to cause operation of the compensating mechanism if the plunger does not operate said end switch.

4. A machine according to claim 2 comprising control means for varying the electrical field to adjust the degree of compensation.

5. An injection molding machine having a reciprocable ram movable from a charge loading position to an end position of an injection stroke, a weighing apparatus arranged for supplying a weighed charge to the ram, compensating means comprising an electrical device for applying a force to vary the action of the weighing apparatus and decrease the weight of a charge fed to the ram by said apparatus if the ram had not reached said end position at the last preceding injection movement thereof, and control means for varying said force to adjust the degree of compensation.

References Cited in the file of this patent

UNITED STATES PATENTS

| | | |
|---|---|---|
| 2,235,324 | Moreland | Mar. 18, 1941 |
| 2,291,150 | Dimick et al. | July 28, 1942 |
| 2,320,594 | Hempel | June 1, 1943 |
| 2,348,372 | Weckerly | May 9, 1944 |
| 2,503,295 | Palmer | Apr. 11, 1950 |
| 2,627,087 | Hendry | Feb. 3, 1953 |
| 2,645,447 | Clark et al. | July 14, 1953 |
| 2,678,185 | Howard | May 11, 1954 |

FOREIGN PATENTS

| | | |
|---|---|---|
| 601,392 | Great Britain | May 5, 1948 |